United States Patent Office 3,536,641
Patented Oct. 27, 1970

3,536,641
AQUEOUS DISPERSIONS OF LINEAR CONDENSATION POLYMERS ADAPTED FOR ELECTRODEPOSITION
Kazys Sekmakas and Frank Ragas, Chicago, Ill., assignors to De Soto, Inc., a corporation of Delaware
No Drawing. Filed Oct. 27, 1966, Ser. No. 589,809
Int. Cl. C09d 3/58, 3/64
U.S. Cl. 260—22    16 Claims

ABSTRACT OF THE DISCLOSURE

Aqueous dispersions particularly adapted for electrophoretic deposition are provided by dispersing in water a salt of a base with a linear condensation polymer having a plurality of hydroxy groups spaced along the length thereof such as an epoxy resin. These hydroxy groups are partially esterified with an unsaturated monocarboxylic acid such as crotonic acid to provide ethylenically unsaturated side chains adapted for copolymerization. The hydroxy-functional unsaturated partial ester so-provided is then copolymerized with at least 2% of monoethylenic monomer comprising a small proportion of unsaturated carboxylic acid to provide an acid copolymer which can be dispersed in water with the aid of a base despite its low level of acidity.

---

The present invention relates to the production of stable aqueous dispersions of linear condensation polymers which are adapted for electrodeposition at the anode to form corrosion resistant coatings.

It is a particular feature of the invention to apply glossy enamel coatings which bake to provide films which are highly resistant to deterioration in contrast with the coatings which are usually associated with electrophoretic deposition, e.g., flat, heavily pigmented primer coatings which must be overcoated with enamels in order to have good properties.

In accordance with normal electrophoretic deposition as practiced in the application of primers, a resin containing carboxyl functionality is associated with a base, usually a volatile nitrogenous base and dispersed in an aqueous medium therewith, the salt formed between the carboxyl-containing resin and the base being dissociated by a unidirectional electrical current and transported thereby to cause the resin to deposit on the anode of the electrical circuit.

In this past practice, the carboxyl-containing resin was formulated to include an acid number in the range of from 30–300, but more usually about 80–120, and the acid value of the resin was relied upon to carry out two different functions, e.g., dispersibility in water through salt formation and transport of the resin as a polyelectrolyte to the anode.

The result of this generally excessive acidity is that the resin deposited from the aqueous medium retains considerable sensitivy to water, clearly reducing the capacity of the resin, even when cured, to resist deterioration as illustrated by salt spray or detergent solution testing. On the other hand, the main purpose of the electrophoretic deposition was merely to insure that the metal object coated, e.g., an automobile, would be provided with at least some minimal protection in locations too remote to receive a paint applied in any normal fashion. With respect to those locations which were accessible, these were given further protection, e.g., by way of an enamel topcoat.

In accordance with the invention, a linear condensation polymer is formulated to include a plurality of hydroxy groups which are spaced along the length of the polymer chain and these hydroxy groups are at least partially esterified with ethylenically unsaturated monocarboxylic acid which resists homopolymerization at elevated esterification temperatures in the absence of free radical polymerization catalysis. Crotonic acid is particularly preferred. In this way there is formed a polyester which contains ethylenically unsaturated side chains adapted for copolymerization, spaced along the length of the linear polymer chain, and which may also contain residual hydroxy functionality. Copolymerization is then carried out with a small proportion of monoethylenic monomer including a proportion of ethylenically unsaturated carboxylic monomer to form an organic solvent-soluble copolymer having reactive carboxyl groups which are appropriately distributed to enable a minimal acid content to be relied upon (via salt formation with a nitrogenous base) to carry the copolymer into stable dispersion with water. Indeed, these dispersions possess excellent mechanical stability because of the small and uniform particle size which is obtained and the minimal acid content and the use of linear condensation polymers of considerable molecular weight enables excellent chemical resistance, e.g. resistance to aqueous detergent systems, to be obtained.

The linear condensation polymer is preferably a diepoxide which is extended in molecular weight by reaction with a difunctional compound, preferably a dihydric compound in order to generate the spaced secondary hydroxy groups and the desired molecular weight at the same time that esterification is used to consume the residual epoxy functionality and to add unsaturated side chains suitable for copolymerization onto the spaced-apart secondary hydroxy groups.

Referring more particularly to the linear condensation polymer which is used, it will be appreciated that these may be of diverse type so long as the product is essentially linear and contains a plurality of spaced-apart secondary hydroxy groups.

The term linear condensation polymer is used herein to identify a polymer in which components which behave in a difunctional manner are coreacted to form a chain in which the reacting components are bound together by ester, ether, or amide groups. These reactions frequently generate water of reaction, but when anhydrides are used, the same structures are produced without the elimination of water and the term condensation, as used herein is intended to embrace the use of the anhydride.

One illustration of an appropriate linear condensation polymer is hydroxy-functional polyesters formed by the reaction of a dicarboxylic acid such as iso- or terephthalic acids or mixtures thereof with an excess of a polyhydric alcohol component which includes a proportion of glycerin. Since the terminal hydroxy groups on the glycerin are more reactive than the central hydroxy group, the polyester can be formed in a substantially linear form, the secondary hydroxy groups being preserved for subsequent esterification by the unsaturated monocarboxylic acid. On the other hand, it is preferred in the invention to employ an epoxy resin as the source of secondary hydroxy groups spaced along the length of the linear polymer.

As will be evident, any linear diepoxide would likely provide the spaced-apart secondary hydroxy groups which are desired, particularly when it is formed by the chain lengthening of a low molecular weight diepoxide with a difunctional material such as bisphenol or a glycol. On the other hand, the preferred polyepoxides are diglycidyl ethers, particularly of dihydric aromatic compounds, especially bisphenols. The term "bisphenol" designates a pair of phenolic groups coupled together through an intervening divalent aliphatic radical, most usually an alkylene group.

Polyethers are particularly preferred since these possess a greater affinity for water and can be adequately dispersed in water at lower acid number which is a feature of the invention.

With particular reference to the diglycidyl ethers of bisphenol such as bisphenol A[2,2'-bis-(p-hydroxyphenyl-propane)], the preferred diepoxides have a molecular weight in the range of from about 350 to about 1,000. When diepoxides of higher molecular weight are used, e.g., up to about 4,000, it is not advisable to increase the chain length thereof at the time of reaction. Instead, these higher molecular weight diepoxides should be viewed as already having sufficient chain length for good properties and they already include secondary hyrdoxy groups appropriately spaced along the length of the polymer.

The monocarboxylic acid which is used for copolymerization is preferably crotonic acid since this acid contains unsaturation well suited for copolymerization and it resists homopolymerization during the elevated temperature treatment needed for the esterification reaction. In this way, gelation is avoided during esterification since polyfunctional acids formed by homopolymerization would tend to cross-link and gel the system before the acidity is substantially completely consumed by the reaction. Other appropriate monocarboxylic acids which contain ethylenic unsaturation appropriate for copolymerization and which do not significantly homopolymerize during esterification are illustrated by monobutyl maleate, monoethyl fumarate, and drying oil fatty acids such as linseed oil fatty acids and dehydrated castor oil fatty acids. The acids referred to above can be used alone or in admixture with one another, it being understood that the drying oil fatty acids have greater chain length and tend to provide a stronger plasticizing action which leads to coatings of greater flexibility and impact resistance. On the other hand, crotonic acid is of exceptional value in the invention and it is preferably used either alone or in admixture with one of the other acids, particularly the drying oil fatty acids.

The proportion of esterifying acid should be at least 5% of the weight of the final ester reaction product and is preferably in excess of that amount which will completely consume all of the epoxy functionality which remains after the diepoxide used has been upgraded in its chain length by reaction with the difunctional reagent, e.g., bisphenol or some other glycol which may be present during the esterification reaction. At least a 10% excess based on the aforesaid stoichiometry is preferred. As will be understood, the epoxy functionality is consumed when it is converted, for example, to an hydroxy ether. On the other hand, all of the hydroxy functionality of the diepoxide may be consumed which, of course, includes the epoxy functionality. As is well-known, and in such calculations, each epoxy functionality is viewed as corresponding to a pair of hydroxy functionalities since the first reaction with monocarboxylic acid consumes the epoxy group and generates a secondary hydroxy group, as indicated before, and the second reaction is with the secondary hydroxy group so-generated.

Stated another way, a preferred minimum proportion of monocarboxylic acid is equal to the number of epoxy equivalents which are available less the number of hydroxy equivalents which may be used for upgrading the diepoxide plus 10%. The maximum proportion of monocarboxylic acid is determined by the hydroxy functionality which is available to be consumed. It is also possible for a small excess of monocarboxylic acid to be present, but little purpose is served by such excess and it is preferred to have the monocarboxylic acid which is used largely consumed in the esterification reaction.

It is of interest to note that if any small amount of unsaturated monocarboxylic acid remains unreacted that such acid becomes tied into the final product through copolymerization when the free radical polymerization catalyst is added to the mixture. In this copolymerization reaction, the acidity of the monocarboxylic acid is retained.

As will be understood, in the normal situation, the proportion of monocarboxylic fatty acid which is used is insufficient to consume all of the hydroxy groups which are available and some of these are therefore left to participate in a subsequent curing reaction to be discussed hereinafter.

To complete the discussion of the esterification reaction, it will be understood that the esterification reaction with monocarboxylic acid is a conventional reaction which is normally conducted at elevated temperatures in the range of from 300–500° F., and more usually at temperatures of from 350–500° F. The reaction is usually assisted by the presence of an esterification catalyst which serves to make the reaction more rapid and to facilitate its progress at somewhat lowered temperature. Catalysts appropriate for esterification are a matter of common knowledge in the art and will not be discussed at length herein except to state that appropriate esterification catalysts are employed in the examples. Also, the reaction is generally conducted in the liquid phase in a high solids esterification reaction in which very little organic solvent is present. Normally, the only solvent used would be a small proportion of a refluxing agent such as xylol which would boil out of the system to be condensed and returned after the water of condensation has been removed therefrom. At the close of the reaction, the xylol return would be stopped and the xylol would boil away and be removed to insure the absence of water from the system. As is also well-understood, the removal of the water of condensation facilitates the progress of the esterification reaction.

As should now be evident, the chain lengthening reaction which may be carried out and the esterification with monocarboxylic acid which is conducted provides an organic solvent-soluble resin which is essentially devoid of acidity but which contains ethylenic unsaturation appropriate for copolymerization on a number of side chains which are spaced apart along the length of the resin. It is this unsaturation which is relied upon in the invention in an organic solvent solution polymerization.

The copolymerization which is carried out is facilitated by the addition of organic solvent which serves to thin the resin solution and facilitate the polymerization. As will be readily understood, the more vinyl monomer which is used in the copolymerization reaction, the larger will be the proportion of solvent needed in order to prevent viscosity from becoming excessive.

In the invention, one can employ monoethylenic monomer, preferably vinyl monomers, in an amount of from 2–30%, based on the weight of the ester reaction product which is formed, it being preferred to employ proportions of from 5–25% on the same basis. As will be evident, copolymerization cannot be carried out to too great an extent for this will serve to increase viscosity excessively. On the other hand, a proportion of the vinyl material is constituted by an ethylenically unsaturated carboxylic acid preferably constituted by a monocarboxylic acid such as acrylic acid, methacrylic acid, or crotonic acid, but which may also be constituted by polycarboxylic acids such as maleic acid and fumaric acid. In order to insure full incorporation of the ethylenically unsaturated carboxylic acid into the condensation polymer, it is preferred that the major proportion of the monomer which is used be free of the carboxyl group since this helps to insure that the acid participates in the copolymerization. Particularly preferred non-acidic monomers are vinyl aromatic monomers such as styrene, vinyl toluene, and $C_1$–$C_4$ alkyl and halogen substitution products thereof, but other vinyl monomers, and especially those which tend to introduce hardness or toughness into the polymer, such as methyl methacrylate and acrylonitrile, are preferred.

Referring again to matters which are well-known to the art, the solution copolymerization reaction is generally conducted at an elevated temperature, but it is not usual to employ temperatures as high as are normally required for the esterification reaction. Also, a free radical polymerization catalyst is added, the specific catalyst selection being well-known to the art and being primarily dictated by the temperature selected for copolymerization. At the preferred reaction temperatures of from 200–275° F., cumene hydroperoxide is a typical free radical generating polymerization catalyst. By lowering the temperature and adding the free radical catalyst, the esterification reaction is substantially terminated.

While the final copolymer product may be devoid of hydroxy functionality, it preferably possesses an hydroxy value in excess of 15, more preferably in excess of 25, since this enhances the water dispersibility and the cure capacity of the copolymer. On the other hand, the acidity of the products which are produced in the invention should be more carefully controlled since this factor is more critical to the invention.

In the invention, one can tolerate an acid number up to about 60, but an acid number of 50 represents a preferred approximate upper limit of acidity. When the acid number is excessive, it is difficult to sufficiently consume it when the electrodeposited coating is baked and the residual acidity introduces problems of water sensitivity. The reduced acid values relied upon in the present invention not only provide coatings which are far less sensitive to water, but the conductivity of the film is reduced so that excessively thick films are not deposited. More preferably, the acid number of the copolymer product is less than about 30, and it is a feature of the invention to achieve adequate dispersibility in water with such low acid number. As will be appreciated, the utilization of linear polyethers and the uniform distribution of the available acidity along the length of the linear condensation polymer enables the small proportions of acid which are relied upon herein to provide adequate dispersion of the copolymer product in aqueous medium using a base, especially a volatile nitrogenous base such as ammonia or an organic amine. As will be evident, the volatile nitrogenous base forms a salt with the carboxylic copolymer, the salt formation forming what is in essence an amine soap which provides an affinity for water.

While ammonia is suitable and preferred in some instances for reason of cost, the volatile aliphatic amines are of particular value for more accurate control of pH since they do not as easily volatilize out of the bath. These aliphatic amines are illustrated by monomethyl amine, dimethyl amine, diethyl amine, triethyl amine and morpholine. Nonvolatile bases are less desirable, though potentially useful and are illustrated by the hydroxides and alkaline salts of sodium and potassium. Broadly, the pH of the electrophoretic bath may vary from about pH 6 to about pH 10, different specific resins depositing best at different pH. A feature of the use of copolymers of low acid value is the capacity to use these at higher pH, e.g., pH 8.5–9.5.

It is sometimes desirable to facilitate dispersion by employing an organic solvent which is miscible with water since this facilitates subsequent dispersion of the polymer in the desired aqueous medium. The preferred solvents are dioxane, ethanol, isopropanol, 2-ethoxy ethanol, 2-ethoxy ethanol acetate, propyl alcohol, etc. Thus and when solvents are added and expected to remain in the copolymer product which is formed, these solvents are preferably of the water-miscible type.

In the preferred situation, the resin which is electrodeposited contains both carboxyl and hydroxyl functionalities and these can inter-react on baking to provide increased resistance to solvent attack.

It is desired to point out that one cannot rely solely upon the acid value of the resin to provide adequate cure since reasonably adequate cure requires a minimum cross-link density to be achieved, and this is especially true for those resins of sufficiently low molecular weight to enable dispersion in water. When the resin contains sufficient acidity to provide an adequate cross-link density, then it is difficult to consume all of the acid groups during the cure, and the residual acidity leads to failure when the coated and baked panel is tested for salt spray resistance and detergent resistance. On the other hand, when the acidity is reduced, the dispersions tend to become unstable and there is not enough acidity to provide an adequate cross-link density when cured. This is the area in which the present development exists, e.g., if it were not for the residual hydroxy groups, the resin would not cure adequately, and these same hydroxy groups, especially in a polyether structure, enable better dispersion in water at the lower acid values which are contemplated.

As will be understood, after the copolymer products of the invention are electrodeposited on the anode, the coated anode is removed from the electrocoating bath and cured by baking, appropriate baking temperatures being broadly in the range of from 250–500° F., which are applied for periods of time varying from an hour to a few seconds with the highest temperature. In the absence of any external amine component, it is preferred to apply baking temperatures of the order of 350–400° F. for periods of time of from 10–30 minutes.

The cure can be further improved through the use of amino resins capable of being dispersed or dissolved in water either alone or with the aid of a base, especially those described in the prior copending application of Kazys Sekmakas Ser. No. 529,924, filed Feb. 25, 1966, now U.S. Pat. No. 3,450,660 issued June 17, 1969. These amino resins are preferably selected so that all of the resin components electrodeposit together with no portion thereof building up in the aqueous electrophoretic bath, but this is not essential.

When a resinous component containing a nitrogen-carried methylol group is included in the copolymer as described in said application Ser. No. 529,924, or separately in the electrophoretic bath for deposition with the copolymer, then the baking temperature can be reduced, if this is desired, or the cure can be more extensive to increase chemical and solvent resistance as well as the hardness of the film.

It should be understood that the details of the electrodeposit of any aminoplast component is not a feature of this invention.

Referring to miscellaneous aspects of the invention, the electrophoretic deposition used herein may be used with clear resins or pigmented resins and the pigmentation can be of any hue or shade desired. The electrophoretic deposition process itself is well known, it being conventional to apply a unidirectional electrical current having a potential in the range of from about 50 to about 500 volts to cause the deposition of the carboxylic resin together with any pigment which has been associated therewith. The deposit of resin occurs on the anode of the electrical system and the article to be coated is, accordingly, electrically connected to form the anode and immersed in the electrophoretic bath.

The invention is illustrated in the examples which follow.

EXAMPLE 1.—PREPARATION OF EPOXY-VINYL COPOLYMER

[Part A]

| | Parts by weight | |
|---|---|---|
| Epoxy resin [1] | 1,520 | Charge into reactor equipped with an agitator, thermometer, Dean-Stark trap, reflux condenser and nitrogen inlet tube. Heat to 470° F. Hold for 30 minutes. |
| Bisphenol A | 900 | |
| Tall oil fatty acids | 40 | |
| Lithium naphthenate | 3.6 | |
| Xylol | 100 | |
| Linseed fatty acids | 3,600 | |
| Crotonic acid | 60 | |
| 1,1'-isopropylidenebis (p-phenyleneoxy)di-2-propanol. | 600 | Add. Reheat to 470° F., and remove water of esterification. Hold for an acid value of 20. |
| Triphenyl phosphite | 10 | |
| Xylol | 100 | |
| Mineral spirits | 656 | Add and cool to 245–255° F. |

[Part B.]

| | | |
|---|---|---|
| Vinyl toluene | 268 | Premix monomers and catalyst and over one hour at 250°F. Hold for one hour. |
| Glacial methacrylic | 132 | |
| Cumene hydroperoxide | 117 | |
| Cumene hydroperoxide | 67 | Add catalyst and hold for additional 3 hours. |

Final Charateristics:
- Solids, percent ................................ 88.1
- Viscosity (Gardner) .......................... $Z_6+$
- Color (Gardner-Holdt) ...................... 6–7
- Acid value ...................................... 28
- Hydroxy ........................................ 16

[1] The epoxy resin is a substantially diglycidyl ether of 2,2-bis-(p-hydroxyphenyl)propane) having an average molecular weight of about 390, an epoxide equivalent weight of 190 (grams per epoxide equivalent weight) and a melting point of from 8–12° C.

EXAMPLE 1, PART C.—PREPARATION OF EPOXY COPOLYMER DISPERSION

| | Water addition time, min. | Parts by weight | |
|---|---|---|---|
| Epoxy copolymer produced above | | 1,000 | Charge into reactor. Heat to 200° F. |
| Triethyl amine | | 20 | |
| Diisopropyl amine | | 20 | |
| Distilled water | 60 | 70 | Add water under vigorous agitation in small portions. |
| Do | 20 | 70 | |
| Do | 15 | 70 | |
| Do | 10 | 70 | |
| Do | 10 | 70 | |
| Do | 30 | 680 | |
| Do | 10 | 1,000 | |

Final characteristics of dispersion:
- Solids, percent ................................................. 30.1
- pH ................................................................ 9.1
- Consistency ........................................... Milky dispersion
- Particle size, microns ......................................... 1–2

The epoxy copolymer resin dispersion of this example is diluted with additional distilled water to 10% resin solids.

A laboratory scale electrodeposition unit is used to prepare coatings from the resin dispersion. The same coating procedure described in Example 3 hereinafter is used.

Film build properties, when plated 60 seconds at 80° F. on 4 inch wide by 8 inch dipped length phosphatized steel panels are as follows:

| Voltage | Film thickness mil | Appearance |
|---|---|---|
| 50 | 0.10 | Smooth, glossy. |
| 100 | 0.35 | Do. |
| 150 | 0.60 | Do. |
| 200 | 0.80 | Do. |

Coulombs per gram of resin deposited are computed from the formula:

$$\frac{\text{Amperes} \times \text{seconds}}{\text{Grams of Coating Deposited}} = 28$$

EXAMPLE 2

Example 1 is repeated using only vinyl toluene so that the glacial methacrylic acid is omitted.

Comparative dispersion properties of Example 1 and Example 2

*Example 1.*—This epoxy-vinyl toluene-acrylic acid copolymer contains carboxylic acid groups distributed along the copolymer chain. The carboxylic acid groups provide reactive sites for salt formation to generate amino soaps and this results in a dispersion in water having uniform particle size (1–3 microns) and excellent mechanical stability. Melamine-formaldehyde condensates or corresponding triazine or other aminoplast resins can be incorporated into the dispersion if desired. No additional surface active agent is needed to improve or stabilize the dispersion.

*Example 2.*—Ths epoxy ester contains no methacrylic acid. This dispersing properties in water are difficult and in pigmented systems, this epoxy ester could not be neutralized to a water dispersible system. The particle size of the dispersion was not uniform and melamine-formaldehyde condensates tend to separate from this dispersion.

EXAMPLE 3.—PREPARATION OF EPOXY-VINYL COPOLYMER

| | Parts by weight | |
|---|---|---|
| Epoxy resin [1] | 1,520 | Charge into a reactor equipped with an agitator, thermometer, Dean-Stark trap, reflux condenser, and nitrogen inlet tube. Heat to 470° F. Hold for 30 minutes. |
| Bisphenol A | 900 | |
| Tall oil fatty acids | 40 | |
| Lithium naphthenate | 3.6 | |
| Xylol | 100 | |
| Triphenyl phosphite | 10 | |
| Linseed fatty acids | 3,600 | |
| Crotonic acid | 70 | Add. Reheat to 470° F. and remove water of esterification. Hold for an acid value of 18. |
| 1,1'-isopropylidenebis (p-phenyleneoxy)di-2-propanol. | 1,000 | |
| Xylol | 100 | |
| Mineral spirits | 640 | Add. Cool to 245–255° F. |
| Vinyl toluene | 268 | Premix monomers and catalyst and and add over one hour at 250° F. Hold for one hour. |
| Acrylic acid | 132 | |
| Cumene hydroperoxide | 117 | |
| Cumene hydroperoxide | 67 | Add catalyst and hold for an additional three hours. |

[1] The epoxy resin is a substantially diglycidyl ether of 2,2'-bis-(p-hydroxyphenyl)propane) having an average molecular weight of about 390, an epoxide equivalent weight of 190 (grams per epoxide equivalent weight) and a melting point of from 8–12° C.

Final characteristics of epoxy copolymer

Solids—86.1%
Viscosity (Gardner)—$Z_6+$
Color (Gardner-Holdt)—7
Acid value—27.5
Hydroxy value—31

Formulation for electrocoating

A gray primer formulation, using epoxy copolymer for electrophoretic deposition is as follows:

|  | Percent |
|---|---|
| Titanium dioxide | 2.82 |
| Excelsior carbon black | 0.03 |
| Nonvolatile resin | 7.15 |
|  | 10.00 |

Nonvolatile resin composition

|  | Percent |
|---|---|
| Epoxy copolymer of Example 3 | 85 |
| Triazine resin[1] | 15 |

[1] The triazine resin is a condensation product of 4 moles of formaldehyde with 1 mol of benzoguanamine in the presence of excess butanol and an acid catalyst to provide a heat-hardening resin etherified with butanol to provide solvent solubility.

| Primer composition: | Parts by weight |
|---|---|
| Titanium dioxide | 197 |
| Carbon black | 2 |
| Epoxy copolymer of Example 3 (86.1% solids) | 494 |
| Triazine resin (74.4% solids) | 101 |
| Triethyl amine | 8 |
| Diisopropyl amine | 8 |
| Distilled water to 10% total solids. | |

This triazine resin in the form of a 74.4% solids solution in ethyl acetate is mixed into the epoxy copolymer together with the titanium dioxide, the carbon black and the various amines before the water is added. Appropriate admixture can be effected by pebble milling for 16 hours. Thereafter, the distilled water is added with vigorous agitation until the desired solids content is reached.

Coating procedure

The coating operation is performed in a metal tank, which is equipped with a recirculating pump and thermometer. The tank serves as a cathode and zinc phosphate treated steel panels are utilized as the anodes. The volume of the bath is 2 liters. Direct current is imposed on the metal container (cathode) and on the steel panels (anode) from an external circuit. Steel panels 4 inches wide and 8 inches dipped length are used as anodes for the coating.

Coating conditions

The voltage across the bath is run up from zero to a maximum of 150 volts during the panel coating operation to deposit a film before the electrical resistance of the film virtually stops resin deposition at the maximum voltage used. The deposited film, even before baking, is water resistant, slightly tacky and has very good adhesion to metal.

After baking for 20 minutes at 400° F., the film cures to a solvent resistant, pore free, hard and flexible coating.

PERFORMANCE CHARACTERISTICS (EXAMPLE 3)

| Percent solids | 10 | 10 | 10 |
|---|---|---|---|
| pH | 8.6 | 8.6 | 8.6 |
| Resistivity, ohms | 4,000 | 4,000 | 4,000 |
| Voltage | 50 | 100 | 150 |
| Time, secs | 60 | 60 | 60 |
| Coulombs/gram deposited | 20.7 | 16.7 | 14.3 |
| Film thickness, mil | 0.45 | 1.0 | 1.0 |
| Film resistivity | Pass | Pass | Pass |
| 1% detergent at 168° F., hrs | 48 | 48 | 48 |

The invention is defined in the claims which follow.

We claim:

1. An aqueous dispersion adapted for electrophoretic deposition at the anode comprising an aqueous medium having stably dispersed therein a salt of a base with an acid copolymer, said acid copolymer comprising linear condensation polymer having a plurality of hydroxy groups spaced along the length thereof and selected from the group consisting of linear diepoxides and hydroxy-functional polyesters formed by the reaction of iso- or terephthalic acids or mixtures thereof with an excess of a polyhydric alcohol including a proportion of glycerin, said hydroxy groups being partially esterified with ethylenically unsaturated monocarboxylic acid resistant to homopolymerization to provide ethylenically unsaturated side chains adapted for copolymerization spaced along the length of said condensation polymer, said partially esterified condensation polymer having an hydroxy value in excess of 15 and being copolymerized in the presence of free radical polymerization catalyst with monoethylenic monomer in an amount of from 2–30%, based on the weight of said polymer ester, said monoethylenic monomer comprising ethylenically unsaturated carboxylic acid providing said copolymer with an acid number up to about 60.

2. An aqueous dispersion as recited in claim 1 in which said monocarboxylic acid resistant to homopolymerization comprises crotonic acid.

3. An aqueous dispersion as recited in claim 1 in which said base is a volatile nitrogenous base providing a pH in said aqueous medium of from about pH 6 to about pH 10.

4. An aqueous dispersion as recited in claim 1 in which said linear condensation polymer is a diepoxide.

5. An aqueous dispersion as recited in claim 4 in which said diepoxide is a diglycidyl ether of a dihydric aromatic compound.

6. An aqueous dispersion as recited in claim 4 in which said diepoxide is a diglycidyl ether of a bisphenol having a molecular weight up to about 4000.

7. An aqueous dispersion as recited in claim 4 in which said monocarboxylic acid is employed in a stoichiometric excess of at least 10% based on the consumption of all of the epoxy functionality in said diepoxide.

8. An aqueous dispersion as recited in claim 1 in which said aqueous dispersion includes a proportion of dispersed aminoplast resin adapted to be electrodeposited with said copolymer.

9. An aqueous dispersion as recited in claim 1 in which said copolymer has an acid number less than about 30.

10. An aqueous dispersion adapted for electrophoretic deposition at the anode comprising an aqueous medium having stably dispersed therein a salt of a volatile nitrogenous base with an acid copolymer, said acid copolymer comprising linear diepoxide having a plurality of hydroxy groups spaced along the length thereof, the epoxy groups of said diepoxide and some of said hydroxy groups being esterified with monocarboxylic acid comprising at least 5% of the weight of the ester reaction product of ethylenically unsaturated monocarboxylic acid selected from the group consisting of crotonic acid, monoesters of maleic and fumaric acids and drying oil fatty acids to provide ethylenically unsaturated side chains adapted for copolymerization spaced along the length of the ester reaction product, said partial ester reaction product having an hydroxy value in excess of 15 and being copolymerized in the presence of free radical polymerization catalyst with monoethylenic monomer in an amount of from 2–30%, based on the weight of said ester reaction product, said monoethylenic monomer comprising ethylenically unsaturated carboxylic acid providing said copolymer with an acid number less than about 30.

11. An aqueous dispersion as recited in claim 10 in which said diepoxide is a diglycidyl ether of a bisphenol having a molecular weight up to about 4000.

12. An aqueous dispersion as recited in claim 10 in which said copolymer has an hydroxy number in excess of 25.

13. An aqueous dispersion as recited in claim 10 in which said monocarboxylic acid comprises crotonic acid and drying oil fatty acid.

14. An aqueous dispersion as recited in claim 10 in which said monoethylenic monomer is present in an amount of from 5–25%, based on the weight of said ester reaction product, and said ethylenically unsaturated carboxylic acid is forming part of said monoethylenic monomer selected from the group consisting of acrylic acid, methacrylic acid and crotonic acid.

15. A method of providing linear condensation polymer adapted for electrophoretic deposition at the anode comprising partially esterifying a linear diepoxide having a plurality of hydroxy groups spaced along the length thereof with at least 5% by weight, based on the weight of the ester reaction product, of ethylenically unsaturated monocarboxylic acid resistant to homopolymerization to provide ethylenically unsaturated side chains adapted for copolymerization spaced along the length of an hydroxy-functional ester reaction product, and then copolymerizing said ester reaction product with monoethylenic monomer in an amount of from 2–30%, based on the weight thereof, said monoethylenic monomer comprising ethylenically unsaturated carboxylic acid providing said copolymer with an acid number up to about 60.

16. An aqueous dispersion adapted for electrophoretic deposition at the anode comprising an aqueous medium having stably dispersed therein a salt of a base with an acid copolymer, said acid copolymer comprising linear condensation polymer having a plurality of hydroxy groups spaced along the length thereof and selected from the group consisting of linear diepoxides and hydroxy-functional polyesters formed by the reaction of iso- or terephthalic acids or mixtures thereof with an excess of a polyhydric alcohol including a proportion of glycerin, said hydroxy groups being partially esterified with ethylenically unsaturated monocarboxylic acid resistant to homopolymerization to provide ethylenically unsaturated side chains adapted for copolymerization spaced along the length of said condensation polymer, said partially esterified condensation polymer having an hydroxy value in excess of 15 and being copolymerized in the presence of free radical polymerization catalyst with monoethylenic monomer in an amount of at least 2%, based on the weight of said polymer ester, said monoethylenic monomer comprising ethylenically unsaturated carboxylic acid providing said copolymer with an acid number less than about 30.

References Cited

UNITED STATES PATENTS

| | | | |
|---|---|---|---|
| 2,570,385 | 10/1951 | Rust | 260—23 |
| 2,785,383 | 3/1957 | Foster | 260—23 |
| 3,190,899 | 6/1965 | Walton et al. | 260—404.8 |
| 3,340,172 | 9/1967 | Huggard | 204—181 |
| 3,392,129 | 7/1968 | Hoy et al. | 260—22 |

DONALD E. CZAJA, Primary Examiner

R. W. GRIFFIN, Assistant Examiner

U.S. Cl. X.R.

117—132, 161; 204—181; 260—18, 21, 23, 29.6, 32.4, 32.6, 33.4, 33.6, 37, 40, 41, 834, 850, 851, 873